S. CANBY.

Grain Winnower.

No. 283.

Reissued Nov. 14, 1854.

N. PETERS. Photo-Lithographer, Washington, D. C.

UNITED STATES PATENT OFFICE.

SAMUEL CANBY, OF ELLICOTT'S MILLS, MARYLAND.

IMPROVEMENT IN WINNOWING-MACHINES.

Specification forming part of Letters Patent No. 9,500, dated December 28, 1852; Reissue No. 283, dated November 14, 1854.

*To all whom it may concern:*

Be it known that I, SAMUEL CANBY, of Ellicott's Mills, in the county of Baltimore and State of Maryland, have invented a new and useful Improvement in Winnowing-Machines; and I do hereby declare that the following is a full, clear, and exact description of the construction and operation of the same, reference being had to the annexed drawings, forming part of this specification, in which—

Figure 1:
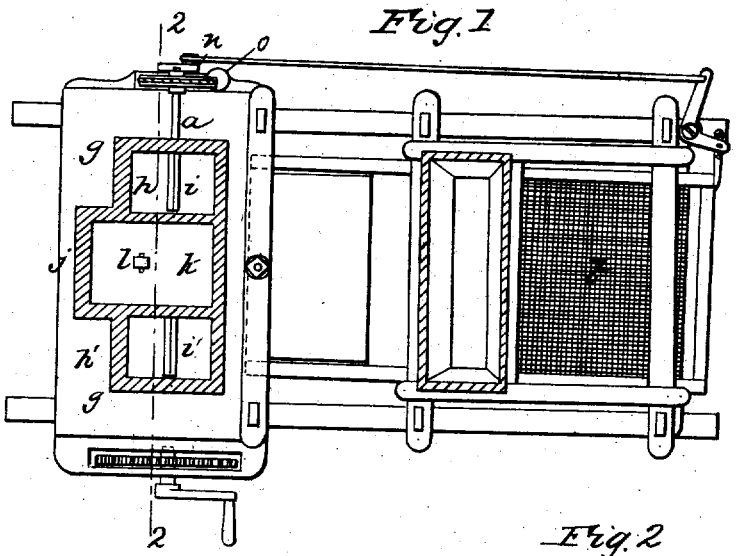
Figure 2:
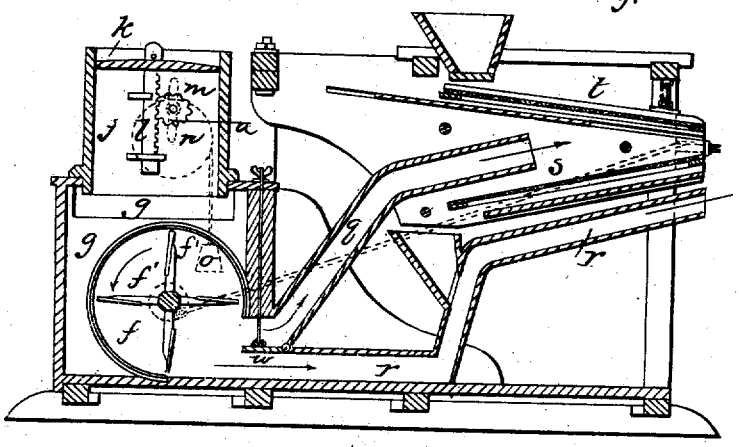
Figure 4:
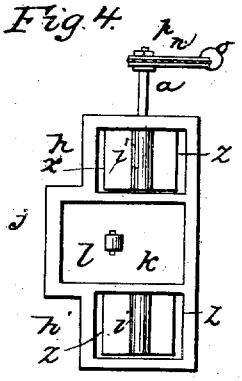
Figure 3:
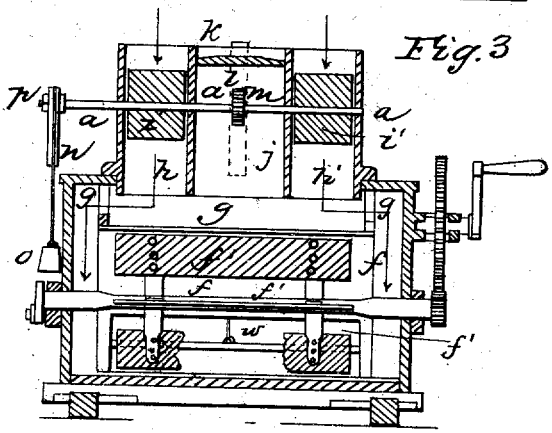

Figure 1 is a top view of winnowing-machine with my improved blast-graduator attached. Fig. 2 is a central longitudinal section. Fig. 3 is a vertical transverse section on line 2 2 of Fig. 1. Fig. 4 is a top view of piston-passage and air-valve boxes, showing the valves closed.

Similar characters of reference in the several figures denote the same part.

My invention relates to the manner of graduating the blast of winnowing-machines, so that it shall not be influenced by the irregularities of velocity to which the fan or blower may be subjected.

The invention consists in constructing above the fan-chamber, and communicating with it, a regulator consisting of three apartments, the exterior, governed by suitable valves, being for the admission of air to the blower, and the central apartment furnished with a piston balanced by a weight, as will be described, so as within a given limit to sustain the pressure of atmosphere due to the rarefaction produced by the revolution of the blower, the piston being so connected with the valves in the side apartments that any motion given to it will be instantly communicated to the said valves, causing them, in a manner to be described, to enlarge the air-passages when the blast is weakened, and diminish their extent when the blast becomes too great.

To enable others skilled in the art to make and use my invention, I will proceed to describe the construction and operation of the same, and as it is independent of any particular construction of winnowing-machine, and, in fact, applicable to the automatic graduation of fan-blasts generally, I shall briefly designate the several parts of the machine on which I employ it, leaving the drawings to explain such parts as are not closely connected with the invention.

*f* is the fan-chamber, open at its ends, as usual, and inclosed in a case, *g*, upon which is placed the graduating apparatus. *f'* is the fan or blower. *q* and *r* are the air-channels leading from the fan-chamber, the amount of blast thrown into each being governed by the flap-valve *w*. *t* is the riddle, and *s* the screen. The regulator consists of three chambers, *h*, *h'*, and *j*, placed upon the conducting-chest *g*, and communicating with said chest and the open air. Through the three chambers runs a shaft, *a*, upon which, in the side chambers, *h h'*, are the valves *i i'*, the area of said chambers, with the exception of the spaces *z*, shown in Fig. 4. The central apartment, *j*, contains a piston, *k*, which occupies the entire horizontal area of the apartment, with the exception of sufficient space to insure a free play up and down. The rod *l* of this piston has a rack on one side, into which meshes a pinion, *m*, on the shaft *a*, causing any motion of the piston to be immediately communicated to the valves *i i'* in the side apartments, *h h'*. One end of the shaft *a* extends without the box *h*, and bears on its extremity a pulley, *n*, on which is a cord and weight, *o*. This pulley is so arranged by slot in its side that it may be adjusted to any desired eccentricity with respect to the shaft *a*, and secured in position by nut and screw *p*. so as to regulate at pleasure the effective leverage of the weight.

The operation of the above-described mechanism is as follows: The action of the weight *o* on the eccentric pulley *n* is such as to hold the valves *i i'* open; but when, by the revolution of the fan, a partial vacuum is formed in the chest *g*, it is evident that the piston *k* will descend in its chamber *j* a distance depending on the relative force derived from the suction of the fan and atmospheric pressure on the piston on the one hand and the resisting efforts of the weight on the other, which efforts increase as the weight is lifted, the tendency of the weight being to cause the piston to ascend.

Such being the action of the several parts, the operation of the apparatus for automatically graduating the blast will readily be understood. The eccentricity of the pulley *n* is first regulated so as, with a given velocity of the fan, to permit such an opening of the air-passages as will furnish the requisite amount of blast for the purpose required, the degree of eccentricity of the pulley for a given velocity of the fan being determined by experiment, and suitable measures taken for making the adjustment, which need not be specified here. When, therefore, during the operation of the machine, from some inequality of velocity of the fan, the blast is in excess, the air below the piston becomes more rarefied by reason of the additional velocity, causing the exterior pressure on the piston to overcome the force exerted by the weight *o*, and produce the descent of the piston, which movement, operating on the shaft *a*, will move the valves *i i'* toward a horizontal position, so diminishing the openings of the boxes *h h'* as to admit no more air than with the increased velocity of the fan will give the requisite blast, thus restoring the equilibrium. On the other hand, should the fan revolve with less than the necessary velocity, and the blast become weakened, the force due to the weight will preponderate, and the piston *k* be elevated so as to open the air-passages until a sufficient amount of air enters to compensate for the diminished velocity of the fan.

It should be stated that the openings *z z*, which are equal to the difference between the area of the air-boxes *h h'* and the area of the valves *i i'*, are made for the purpose of admitting a small supply of air to the fan, when, from its accelerated velocity, the valves assume a horizontal position, as without such opening the entire supply of air would suddenly be cut off and the fan fail to do its duty.

As above stated, the supply of air will increase in the same proportion as the speed of the fan decreases, and the blast be maintained at the requisite intensity.

What I claim as new and of my own invention is—

The automatic graduation of the fan-blast by means of a piston, *k*, in a passage communicating with the fan-case, balanced by weight to support the atmospheric pressure due to the rarefaction produced by a given velocity of the fan, but movable when said velocity varies, and by connection, substantially as set forth, with valves regulating air-passages *h h'*, so operating them as to diminish the capacity of said passages when the velocity of the fan is too great, and produce the contrary effect if the blast be weakened by a diminished velocity of the fan, as hereinbefore specified.

In testimony whereof I have hereunto signed my name before two subscribing witnesses.

SAML. CANBY.

Witnesses:
E. C. LYONS,
IGNATIUS WATERS.